350-3.78 SR

XR 3,832,698

TX 3049W

United St[11] 3,832,698

Ishii [45] Aug. 27, 1974

[54] HALOGRAPHIC MEMORY WITH RETRIEVAL BY CORRELATION

[75] Inventor: Akira Ishii, Kawasaki, Japan

[73] Assignee: Nippon Telegraph and Telephone Public Corporation, Tokyo, Japan

[22] Filed: Jan. 12, 1972

[21] Appl. No.: 217,157

[30] Foreign Application Priority Data

Jan. 20, 1971 Japan .......... 46-1326

[52] U.S. Cl. .......... 340/173 LT, 350/3.5

[51] Int. Cl. .......... G11c 11/42, G02b 27/00

[58] Field of Search 350/3.5; 340/173 LT, 173 LM, 340/173 SS, 146.3 P; 356/71

[56] References Cited

UNITED STATES PATENTS

| | | | |
|---|---|---|---|
| 3,296,594 | 1/1967 | Van Heerden | 350/3.5 |
| 3,542,448 | 11/1970 | Reynolds et al. | 350/3.5 |
| 3,550,085 | 12/1970 | Silverman | 340/173 LM |
| 3,600,054 | 8/1971 | Gabor | 350/3.5 |
| 3,704,929 | 12/1972 | Sakaguchi et al. | 350/3.5 |

*Primary Examiner*—Ronald J. Stern
*Attorney, Agent, or Firm*—Sughrue, Rothwell, Mion, Zinn & Macpeak

[57] ABSTRACT

A method of correlation detection for obtaining a high identification ability in an optical information retrieval system for retrieving desired information from a hologram memory by checking the coincidence matching between an interrogation signal and the hologram memory contents by utilizing the correlation detection function of a hologram, and a device therefor. A coherent laser light is spatially modulated by an interrogating signal in a modulator and the output light of the modulator is deflected to scan the hologram memory. By coding both the interrogation signal and the hologram memory information in a 2 out of N code, an oscillatory output waveform is obtained during the scanning operation when the interrogation signal is coincident with the hologram memory information and a non-oscillatory output waveform is obtained when such a coincidence does not exist. The matching of the interrogating and interrogated information is determined by detecting the existence of an oscillatory waveform in the output signal. The information retrieval system comprises a hologram memory array storing the information to be retrieved, a spatial modulator for modulating laser light by an interrogation signal, a light deflector for scanning the hologram memory array by deflecting the output beam of the spatial modulator, a matching detector for detecting matching output, and high-pass filters for detecting the oscillatory component in the matching output.

13 Claims, 7 Drawing Figures

3832698

HALOGRAPHIC MEMORY WITH RETRIEVAL BY CORRELATION

BACKGROUND OF THE INVENTION

1. Field of the Invention

The present invention relates to an optical information retrieval system using holography, or more particularly to an information retrieval system for a large capacity memory storing large amounts of information in the form of hologram memory in which the matching between an interrogation signal and the stored information is effected by using correlation detection.

2. Description of the Prior Art

It has been known to use the correlation detection of a hologram in a practical application, such as recognition of a pattern, identification of a character, etc. An information retrieval system using a hologram can be made of much larger capacity with relatively cheap cost as compared with conventional memory devices using magnetic tapes, magnetic cores, semiconductor elements, etc. Accordingly, a wide application of retrieving information concerning voluminous literatures or patent documents using holography is expected.

However, generally speaking, the correlation output is an analog amount so that matching detection between a hologram memory and an interrogation signal based on measurement of the output level involves considerable and difficult problems, such as a stringent requirement for mechanical accuracy.

Thus, except for retrieving a particular pattern or a particular character, a correct coincidence detection is not always guaranteed in the conventional hologram memory optical retrieving system based on a principle of mere measurement of the output level of the matching signal.

An information retrieving system employing holograms has been disclosed in U.S. Pat. No. 3,572,881 (Nishida et al). In this known system, retrieval holograms are prepared on a photographic plate by interference between a laser beam spatially modulated by keywords and a laser beam spatially modulated by memory information to be retrieved. A large number of such retrieval holograms are prepared on a photographic plate and arranged in an array. To retrieve desired information, a selected one of the formerly recorded keywords is used as an interrogation signal and a laser beam is spatially modulated thereby. By illuminating the retrieval hologram memory group, the stored information corresponding to the selected keyword is reproduced. This known system has a drawback in that the interrogation signal is limited to the initially prepared keywords, and hence a wide flexibility of retrieval cannot be expected, or in other words, freedom for the selection of the keyword is not obtained.

SUMMARY OF THE INVENTION

The present invention mitigates the aforementioned disadvantages in the conventional optical information retrieval system using holography.

One object of the invention is to provide a novel optical signal retrieval system, in which any desired interrogation information can be used for retrieving the hologram memory information.

Another object of the invention is to provide a novel optical information retrieval system wherein the matching between the interrogation signal and the hologram memory information is determined by detecting an oscillatory component in the output waveform in scanning the holograms. By this concept the invention realizes great accuracy in detection for coincidence matching by a relatively simple device when compared with conventional systems which are based on a principle of measuring the output level of the matching signal.

The present invention provides a very reliable method of detecting coincidence matching between an interrogation signal and hologram memory information utilizing the correlation detection function of the hologram and it provides an optical information retrieval device based on the above principle of matching detection.

In accordance with the present invention, the information content for the correlation detection is limited to that having digital nature, for instance, an information formed by series of light dots, and further the information is coded in a 2 out of N code. Thus the holograms recording coded information are scanned by a laser beam modulated by interrogation signals also coded in the same manner and the variation in correlation output is checked to see whether it includes an oscillatory waveform component or not. By this practice, the inaccuracy of judgement in the conventional correlation detection is mitigated.

The present invention provides a practical information retrieval system between a large amount of stored information in holograms and any selected interrogation signal wherein the coincidence matching is taken in the aforementioned manner of improved correlation detection for retrieving a desired information from a large capacity hologram memory.

The correlation detection system of the present invention is characterized in that both the interrogation signal and the stored information to be interrogated are digitally coded in a 2 out of N code, and that the holograms are scanned by a laser beam spatially modulated by the interrogation signal and the coincidence matching of the information is detected by checking whether or not an oscillatory waveform component exists in the output waveform of the hologram correlation output light.

In the conventional correlation detection system, coincidence has been determined by measuring the output level of the correlation output. As mentioned above, such a correlation output tends to vary during the operation of the system, and hence the measurement of level may include errors. It has also been a usual practice to measure the output level successively during the time of coincidence and non-coincidence, and since the output level may not have much difference between the coincident and non-coincident times, accordingly, a system based on level detection has the disadvantage of inaccurately determining the matching. Contrary to such a conventional system, in the present invention it is sufficient to detect an oscillatory component in the correlation output during the scanning period, i.e., only to discriminate difference between two distinctively different states and hence the detection is effected with high stability and the reliability of the system is much improved.

The system of the present invention affords a great flexibility for the selection of interrogation signals. Namely, according to the present invention any desired word or character in the stored information to be interrogated may be selected as the interrogation signal, and any combination of the above may also be used. Accordingly, in the system of the present invention any of the stored characters or numerals may be chosen as an interrogation signal. In other words, an interrogation by natural words is possible in the present invention. Owing to this feature the system of the present invention affords a great advantage in retrieving for literature or patent items.

BRIEF DESCRIPTION OF THE DRAWINGS

The system of the invention will more fully be explained by referring to the accompanied drawings in which.

DESCRIPTION OF THE PREFERRED EMBODIMENT

Figure 1:
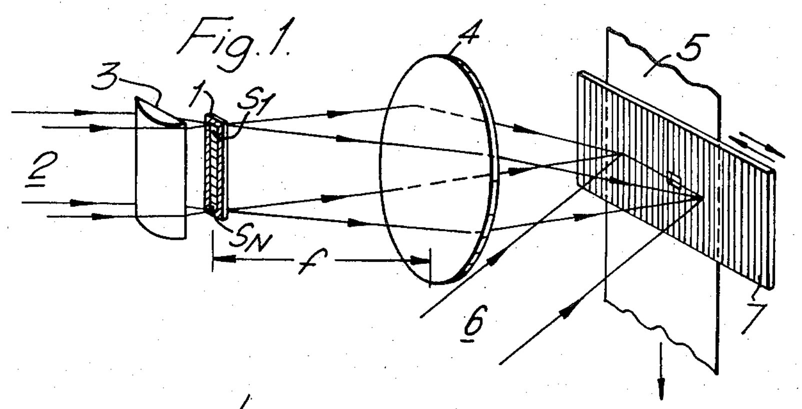
FIG. 1 is a schematic illustration of the method of providing holograms used in the present invention.
Figure 2:
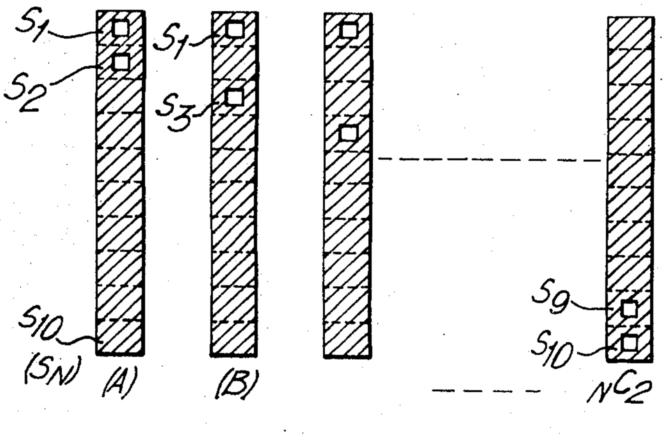
FIG. 2 is an illustration of a possible code pattern used by a modulator for coding the interrogated information stored by holograms.

FIG. 1 shows one basic embodiment for the preparation of holograms storing information used in the system of the present invention. In FIG. 1, a coherent laser beam 2 is focused to a narrow band shaped beam by a cylindrical lens 3 and impinges onto a modulator 1 controlled by the digital information to be stored. The modulator 1 is provided with a plurality of sections $S_1$, $S_2$, . . . $S_N$ as illustrated. In the depicted embodiment, 10 sections $S_1 \ldots S_{10}$ are provided. The information to be stored in the hologram is coded in a 2 out of N code. In the illustrated embodiment, the 10 sections $S_1$–$S_{10}$ or more generally N sections $S_1$–$S_N$ of the modulator 1 correspond to the number N of the 2 out of N code. By selecting any 2 sections from the N or (10) sections to open to pass the laser light 2 with the other N-2 or (8) sections kept closed to interrupt the laser light, the laser light is digitally coded in a 2 out of N code, hereinafter abbreviated as $N^C2$ code. Such selection of code pattern or digital coding is termed as modulation in the present invention. FIG. 2 shows some possible code patterns in $N^C2$ code. In FIG. 2, the left column (A) shows a case in which two sections $S_1$ and $S_2$ are opened, the second column (B) shows a case in which sections $S_1$ and $S_3$ are opened, and the last column (C) shows sections $S_9$ and $S_{10}$ opened. By such selection of two opened sections the $N^C2$ code may be produced, and by this code the information to be stored and later interrogated is coded digitally.

For simplicity each section of the modulator 1 is shown as a simple mechanical shutter, but in practice it is possible to make such sections as electric shutters based on electro-optic crystals which can be controlled by a high speed electronic circuit.

Also it is possible to make the shutter unit of the modulator 1 an electromagnetic shutter using a ribbon microphone.

According to this code the laser beam passes only at the two opened sections of the modulator 1 and then passes through a Fourier-transform lens 4 having a focal length $f$ and impinges onto a photo recording plate or film 5. A reference light beam 6 is also obtained from the same source as the laser beam 2 and is irradiated onto the photo recording film 5 so that a hologram having a predominant single spatial frequency is recorded by interference between the signal light and the reference beam. In front of the photo recording film 5 a mask 7 provided with an aperture having a size corresponding to a desired micro hologram is disposed, and by moving this mask 7 in the lateral or horizontal direction as indicated by arrows in FIG. 1 a row of micro holograms can be recorded on the photo recording film 5.

Figure 3:
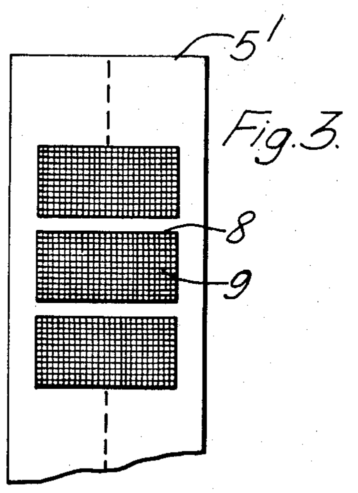
FIG. 3 shows a schematic view of hologram array groups on a photographic film.

After completion of recording of one horizontal row of the micro holograms, the photo recording film 5 is moved vertically so that an array of micro holograms in a matrix shape as shown in FIG. 3 can be provided on a single photo recording film 5.

The mask 7 may conveniently be made of a mechanical element such as a metal plate moving at the front of the film 5.

Each micro hologram in a matrix contains information modulated by the modulator 1 in a 2 out of N code. For example, one micro hologram may store one character such as A as shown in the extreme left column of FIG. 2 which is represented by the modulator 1, having two open sections $S_1$ and $S_2$, and the other micro holograms may store other characters having different codes in the same code series.

FIG. 3 is an example of hologram matrix using a high resolution photographic film 5' as the photo recording plate 5. The photographic film 5' recording hologram matrices may be called a "hologram tape." In the hologram tape 5' shown in FIG. 3, a block 8 of holograms constitutes a hologram matrix comprising a plurality of micro holograms 9 and the tape 5' records a plurality of hologram blocks or matrices arranged at a certain interval.

For instance if we consider a case of storing information concerning literature including the word "communication", the content of the literature is stored in the hologram matrix. Assuming that in one row of the matrix the word "communication" is stored by using 13 micro holograms each storing one character of the word, such as *c*, *o*, *m*, *m*, etc., then the word can be interrogated by using respective interrogation signals having the same content, such as *c*, *o*, *m*, *m*, etc. in succession to detect the existence of the corresponding words having the same characters in continuous locations. Such interrogation signals and the detection of coincidence matching are controlled by a central control unit of the system (not shown and output processing circuits (not shown) in detail).

Figure 4:
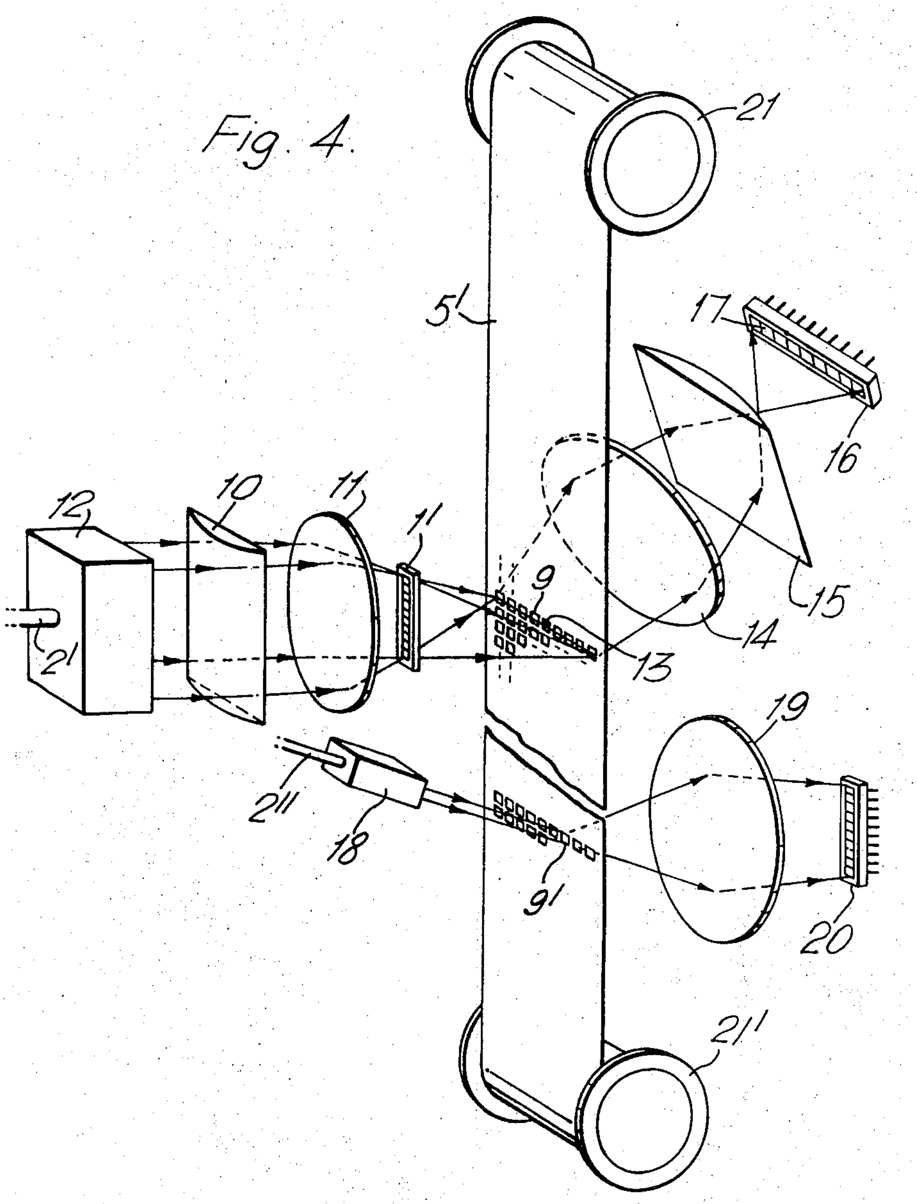
FIG. 4 is a schematic view of a system of the present invention for scanning hologram arrays by interrogation beams.

FIG. 4 is a schematic view of an example of the system of correlation detection by scanning according to the present invention. In FIG. 4, 2' shows graphically a laser beam impinging onto a light deflector 12 in which the beam 2' is deflected and impinges onto a cylindrical lens 10 and then a spherical lens 11. These lenses shape the input beam into a narrow beam and apply it to a modulator 1'. The modulator 1' is an input modulator modulating the input laser beam 2' in a 2 out of N code as shown in FIG. 2 according to the desired interrogation signal. The light passing through the modulator 1' is irradiated as a thin band shaped beam 13 on the hologram tape 5' containing hologram memory information to be retrieved, which had been provided in a manner as explained with reference to FIG. 1. In FIG. 4 in order to simplify the drawing only a small number of hologram units are shown compared with the actual number as shown in FIG. 3. It is to be noted that one hologram has a size on the order of 0.25 mm × 0.25 mm for instance, and therefore a great number of holograms can be recorded in a hologram matrix on the hologram tape 5'.

By moving the hologram tape 5' between a pair of reels 21 and 21', a block of holograms or hologram matrices on the hologram tape 5' can be moved to an interrogation position. Scanning is effected for one hologram matrix while stopping the movement of the film 5' by deflecting the band shaped modulated diffraction light 13 over the one hologram matrix in the longitudinal direction of the hologram tape 5' at a constant speed. During the scanning of the holograms a correlation matching between the interrogation signal given as an input to the modulator 1' and the hologram memory information contained in the hologram tape 5' is effected by the correlation detection function of the hologram and thus the correlation output is observed as a variation of the strength of the penetrating light. The necessary scanning for one hologram matrix is repeated by a predetermined program controlled by a central control unit. As an example the scanning for the word "communication" is effected by first scanning matrix with a laser beam modulated by a code representing a character *c*. Then, after scanning one whole matrix block, the block is scanned by the next character *o* and so on. As the diffraction light 13 passing through the modulator 1' is expanded in a band shape, one row of the hologram matrix which consists of a number of adjacent holograms is scanned simultaneously to check the matching. This is one of the effective features of the system of the present invention.

The correlation output light of the hologram impinges onto a spherical lens 14 and is applied to a coincidence reading detector 16 via a cylindrical lens 15. The lenses 14 and 15 are provided to resolve the hologram output light from simultaneously scanned rows of holograms in the hologram matrix and apply the resolved light onto respective reading elements 17 arranged on the coincidence reading detector 16.

There are alternative practices for the separation of the respective output lights of the holograms. For instance, in the preparation of a row of holograms as shown in FIG. 1 by the horizontal movement of the mask 7, the angle of incident light of the reference light 6 to the photographic recording film 5 may be deviated by a certain angle in the horizontal direction at every location of the holograms. By this arrangement the hologram output light after checking the matching in FIG. 4 is deviated in the respective diffraction direction of each hologram so that the separation of each hologram output light is possible. In this alternative practice, the cylindrical lens 15 can be dispensed with.

In order to read out the content of the hologram memory matrix which was detected to contain the interrogation information, such as for instance the word "communication", a separate laser beam 2'' is provided. Such reading out can be effected at a separate location from the above explained matching detection.

In FIG. 4, 18 is a light deflector deflecting laser beam 2'' to selectively irradiate each hologram 9' of a hologram matrix in which the coincidence of the stored information with the interrogation information is confirmed and reproduces the stored information on a reading detector 20 through a spherical lens 19.

A more detailed explanation of the correlation detection according to the present invention will be given by also referring to FIG. 5 which illustrates a side view of the embodiment shown in FIG. 4.

Assume that the input interrogation signal of the modulator 1' is $S_k(\epsilon)$, an interrogated signal in a hologram is $S_j(\epsilon)$, and both the signals are coded in 2 out of N code. In FIG. 5 the ordinate $\epsilon$ is taken on the modulator 1' and further ordinates $x$ and $\alpha$ are taken on the hologram tape 5' and on the coincidence reading detector 16, respectively. The hologram memory previously provided in a manner as illustrated in FIG. 1 comprises the transmission component given by the following equation with respect to the interrogated information $S_j(\epsilon)$.

$$\exp\{ikm(x-a)\}\tilde{S}_j^*(x-a/\lambda f)+\exp\{-ikm(x-a)\}\tilde{S}_j(x-a/\lambda f) \qquad 1.$$

wherein;

$\exp(x)$: an expression of an exponential equation;

$i$ : unit of imaginary number;

$k = 2\pi/\lambda$: wherein $\lambda$ is the wave length of the laser beam 2;

$m$ : the angle between the optical axis of lens 4 and the direction of the reference light 6;

$f$ : the focal length of the lens 4;

$\tilde{S}_j$: Fourier-transform of $S_j(\epsilon)$;

$*$ : complex conjugate;

$a$ : the position index $x=a$ of the hologram 9 scanned by the diffraction light 13.

The diffraction light 13 passing through the modulator 1' is given by the following equation (2):

$$\exp\{i\pi/\lambda f\, x^2\}\tilde{S}_k(x-s/\lambda f) \qquad 2.$$

wherein;

$\tilde{S}_k(x)$: Fourier-transform of $S_k(\epsilon)$;

$s$ : the position index $x=s$ of the diffraction light 13.

The correlation output light of the hologram is given by the following equation as a product of the first term of equation (1) and the equation (2).

$$\exp\{i\pi/\lambda f\, x^2\}\tilde{S}_k(x-s/\lambda f)\exp\{ikm(x-a)\}\tilde{S}_j^*(x-a/\lambda f)$$

This correlation output light produces the following correlation output amplitude $\Phi_{jk}(\alpha)$ on the receiving surface of coincidence reading detector 16 after passing through lenses 14 and 15.

$$\Phi_{jk}(\alpha)=C_1\int_{-\infty}^{+\infty}\tilde{S}_k\left(\frac{x-s}{\lambda f}\right)\tilde{S}_j^*\left(\frac{x-a}{\lambda f}\right)\exp\left(-2\pi i\frac{\alpha x}{\lambda f}\right)dx \qquad (3)$$

wherein;

$C_1$: a multiplier.

The optical axis of the lenses 14 and 15 has an inclination $m$ to a line normal to the hologram matrix surface.

The equation (3) may be rewritten as follows:

$$\Phi_{jk}(\alpha)=C_2\int_{-\infty}^{+\infty} S_k(\tau)S_j^*(\alpha+\tau)\exp\left\{2\pi i\frac{s-a}{\lambda f}\tau\right\}d\tau$$

wherein;

$C_2$: a multiplier.

Figure 6:
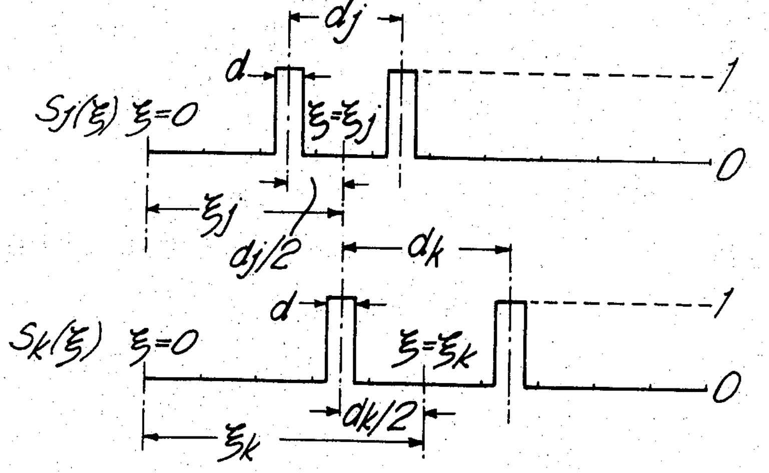
FIG. 6 shows waveforms for explaining light amplitude distributions of modulator output coded by a 2 out of N code.

The informations $S_j(\epsilon)$ and $S_k(\epsilon)$ being coded as 2 out of N codes by the modulators 1 and 1' will have amplitude distributions constituted by amplitude 1 light and amplitude 0 light as shown in FIG. 6.

Considering the light amplitude distributions of $S_j(\epsilon)$ and $S_k(\epsilon)$ shown in FIG. 6 and by calculating $\Phi_{jk}(\alpha)$, it may be seen that the amplitude $\Phi_{jk}(\alpha)$ varies with respect to the index $(s-a)$ depending on whether $S_j(\epsilon)$ is coincident to $S_k(\epsilon)$ or not. When $S_j(\epsilon)$ is coincident with $S_k(\epsilon)$, i.e. when $\epsilon_j=\epsilon_k$ and $d_j=d_k$, the amplitude $\Phi_{jk}(\alpha)$ has a distribution of strength $I(\alpha,\bar{s})=|\Phi_{jk}(\alpha)|^2$ given by the following equation:

$$I(\alpha,\bar{s})=C_3 4/(\pi\bar{s})^2\sin^2\pi\bar{s}(|\alpha|-d)\cos^2(\pi d_k\bar{s}) \quad 4.$$

for $|\alpha \leq d$ wherein;

$\bar{s}=(s-a)/\lambda f$ $C_3$: a multiplier $d$ : dimension of aperture of the modulator.

If the correlation output is received by a coincidence reading element located at $\alpha=0$ and having the receiving width 2$d$, the electrical output $I(\bar{s})$ is given by the following equation:

$$I(\bar{s})=\int_{-d}^{+d} I(\alpha,\bar{s})d\alpha=C_4\Gamma(\bar{s})\cos^2(\pi d_k\bar{s}) \quad (5)$$

wherein;

$$\Gamma(\bar{s})=6/(2\pi d\bar{s})^2\{1-\sin(2\pi d\bar{s})/2\pi d\bar{s}\}$$

$C_4$: a multiplier.

When $S_j(\epsilon)$ is not coincident with $S_k(\epsilon)$, i.e., $\epsilon_j\neq\epsilon_k$ or $d_j\neq d_k$, there will be a case of deriving zero electric output from the coincidence receiving element and a case of deriving an electric output $I(\bar{s})$ therefrom.

$$I(\bar{s}) = C_4/4\Gamma(\bar{s}) \quad 6.$$

Figure 5:
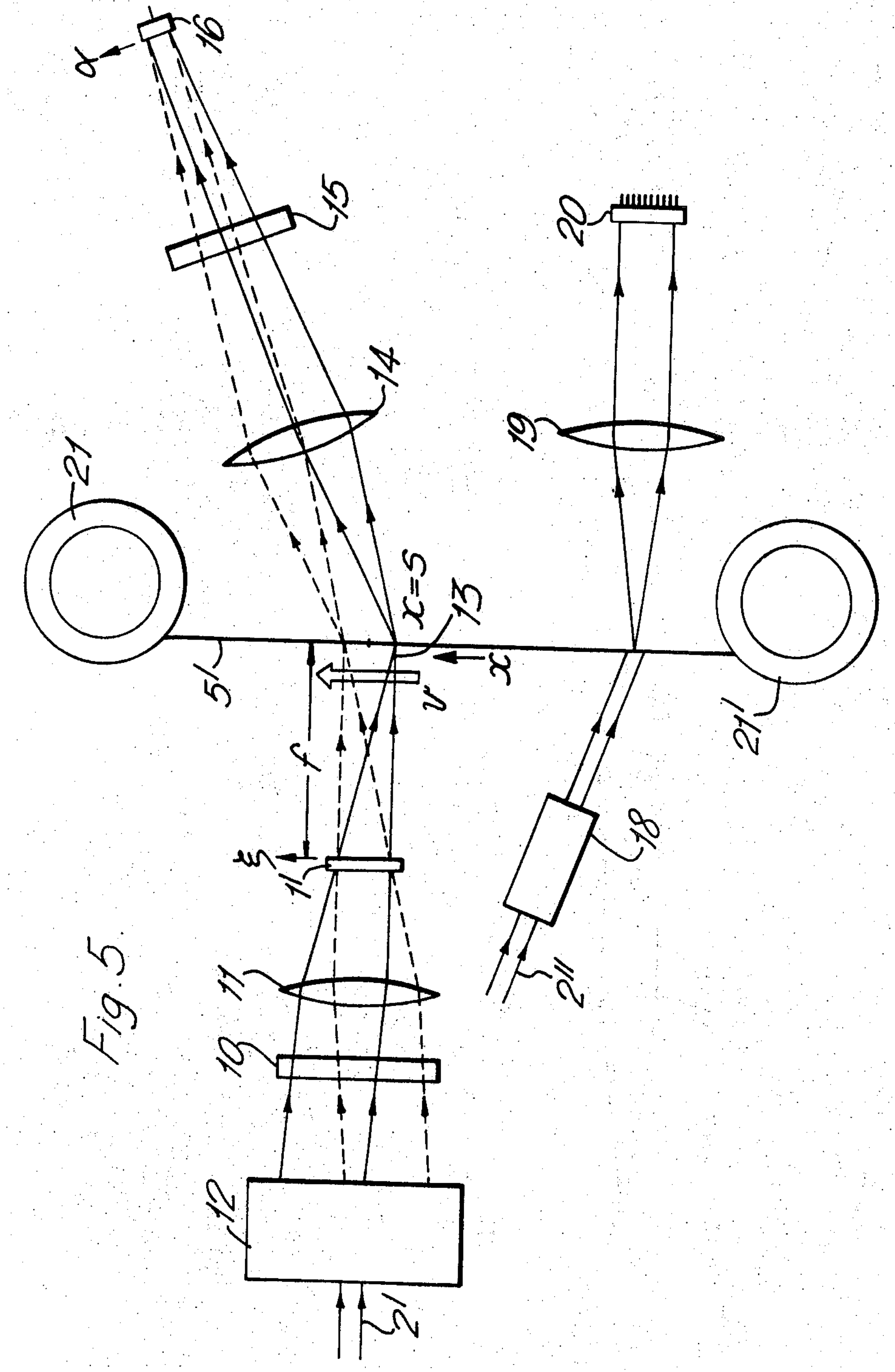
FIG. 5 is a side view of the system shown in FIG. 4.

When we assume the relative velocity of scanning a hologram matrix to be v as shown by the large arrow in FIG. 5, $\bar{s}$ is given by;

$$\bar{s}=vt/\lambda f$$

wherein, $t$ is time.

Accordingly the matching output given by equation (5) will be an oscillatory waveform having an amplitude envelope expressed by $\Gamma(vt/\lambda f)$ and an oscillatory period $\lambda f/vd_k$.

Figure 7:
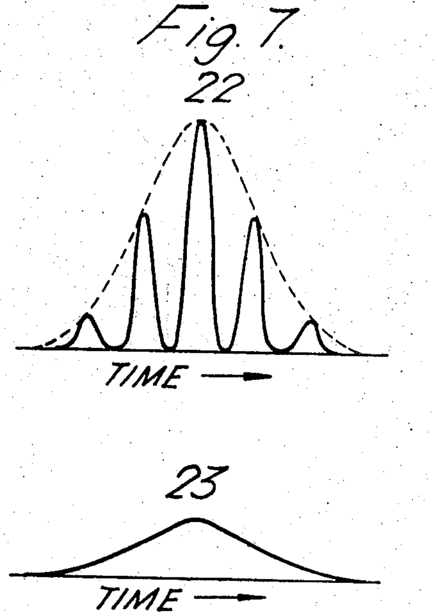
FIG. 7 shows two waveforms in the output signal illustrating coincidence of information and non-coincidence of information, respectively.

On the other hand, the non-matching output given by equation (6) will be a non-oscillatory waveform having an amplitude $\Gamma(vt/\lambda f)$ corresponding to one-fourth of the envelope amplitude of the coincidence or matching output. Referring to FIG. 7, the waveform 22 depicts an output waveform when coincidence matching is detected, and waveform 23 depicts the output waveform when such coincidence does not exist.

The oscillation period $\lambda f/vd_k$ will have a different value owing to the variation of $d_k$ according to the change of the coincidence matching information. However, by selecting the width $d$ of the aperture to be $d\leq p/2$, the coincidence matching output and the non-coincidence output can be separated by means of a high-pass filter having the cutoff frequency $pv/2\lambda f$. In this case, a coincidence or non-coincidence between the interrogation information $S_k(\epsilon)$ and the stored interrogated information $S_j(\epsilon)$ is detected by the presence or absence of an output signal from such a high-pass filter having a cutoff frequency $pv/2\lambda f$.

In one preferred embodiment of the invention, each of the coincidence reading detector elements 17 of the coincidence reading detector 16 are constituted by a photosensitive element, such as a photo-diode, and the output is connected to a high-pass filter having a cutoff frequency of $pv/2\lambda f$. By detecting the output from the high-pass filter the coincidence of the information is detected.

For detecting the abovementioned oscillatory component alternative practices other than using a high-pass filter can be employed. For instance, a comb filter having its pass band structure resembling the teeth of a comb and having pass bands at each frequency of the matching oscillatory waveform can be used. Also, a homodyne oscillation detecting method using a synchronization output as a reference signal can be used as such electric oscillation detecting means.

The system further comprises processing circuits (not shown) which memorize the sequence and the address of the micro holograms for which the coincidence of the interrogation information is detected. The processing circuits, the memory circuits, and the retrieval program embody known techniques and form no part of the present invention.

During the coincidence detection process as explained above, if a synchronization output is required, one column of holograms in the hologram matrix as shown in FIG. 3 arranged in the direction of scanning may be used as synchronization holograms. In order to prepare a synchronization hologram all of the sections $S_1 \ldots S_N$ in the modulator 1 in FIG. 1 may be opened and the hologram may be provided in the same manner as described above. During the matching detection operation the synchronization hologram also produces a matching output waveform with any interrogation information and this waveform may be used as a synchronizing signal.

In the preceding explanation, the stored interrogated information in a hologram is considered as a single code as an example; however, the correlation detection method according to the present invention is not limited to this single interrogated code, but it may be equally applied to detect a plurality of interrogated codes. In this case additional coincidence reading detectors 16 may be provided corresponding to the number of the interrogated codes to be matched simultaneously. For instance, if a hologram has three codes to be interrogated simultaneously, three sets of coincidence reading detectors 16 are provided.

Also, it is possible to implement matching detection for a plurality of interrogation informations by arranging a number of modulators 1' in parallel. In this case, in order to separate the matching outputs, it is necessary to use the previously mentioned method of deviating the incident angle of the reference light at every recording position of the holograms at the time of making the hologram matrix. In this case a corresponding number of coincidence reading detector elements must be provided in the coincidence reading detector 16.

In the foregoing explanation a light deflector is used for scanning the hologram matrix, but it is possible to fix the interrogation information light and to move the hologram matrix surface to scan the hologram memory by the interrogation information. In this case the holograms may be provided on a rotating drum or rotating disk.

According to the correlation detection method of the present invention as explained above, the matching is determined by detecting the presence of an oscillatory component in the correlation output. Accordingly the matching detection is very easy when compared with the conventional practice based on a principle of measurement of output levels which requires a high degree of accuracy, for instance, in the order of a few microns for mechanical matching. Therefore the system of the present invention has high reliability and high accuracy for correlation detection in an information retrieval system.

According to the present invention a desired information may be retrieved at a very high speed from an extremely large amount of information recorded on a hologram tape with a high density and with a high reliability, and it is also possible to effect a high speed parallel matching detection for a plurality of holograms. The holograms used in the information retrieval system of the present invention are provided with a function for storing information and also a correlation detection function. Hence the construction of the controlling logical circuits and the memory device in the processor of the retrieval system can be made very simple and therefore an economical information retrieval system having an exclusive purpose of retrieving information can be realized by using a small capacity computer. This affords a great advantage in a practical retrieval system compared with conventional systems using magnetic tape and a large capacity electronic computer.

The application of the system of the present invention is not limited to a retrieval of literatures or patent informations, but it can be used to retrieve a picture by recording the picture in the holograms accompanied with an interrogated information. The system may be applied in many other uses and wide practical applications and is very effective as a large capacity economical information retrieval device.

I claim:

1. A method of optical information storage and retrieval comprising the steps of:

1. shining a first coherent laser beam through two openings in a first modulator means having a plurality of spaced openings greater than two and onto a photo recording surface while simultaneously
2. shining a second coherent laser beam onto the photo recording surface such that a hologram having a predominant single spatial frequency and being representative of information is recorded on the photo recording surface due to the interference between the first and second coherent laser beams, the said hologram being uniquely related to which two of the plurality of spaced openings in the first modulator means the first coherent laser beam was shone through;
3. shining a third coherent laser beam through two openings in a second modulator means having a plurality of openings greater than two shaped and spaced in the same manner as the openings in said first modulator means and onto the hologram created by steps (1) and (2) while said third coherent laser beam and said hologram are being moved relative to each other; and
4. determining the presence or absence of coincidence between the information represented by the hologram and the information represented by the third coherent laser beam by detecting an oscillatory component in the output created by step (3).

2. An optical information storage and retrieval system comprising:

1. a first modulator means having a plurality of spaced openings greater than two;
2. a photo recording surface positioned adjacent to said first modulator means;
3. means for opening two and only two of the plurality of spaced openings in said first modulator means at a time;
4. means for shining a first coherent laser beam through the openings in said first modulator means and onto said photo recording surface;
5. means for shining a second coherent laser beam onto said photo recording surface at the same time as the first coherent laser beam is being shone on said photo recording surface such that a hologram having a predominant single spatial frequency and being representative of information may be recorded on said photo recording surface due to the interference between the first and second coherent light beams, the said hologram being uniquely related to which two of the plurality of spaced openings in said first modulator means the first coherent laser beam was shone through;
6. a second modulator means having a plurality of openings greater than two shaped and spaced in the same manner on the openings in said first modulator means;
7. means for opening two and only two of the plurality of spaced openings in said second modulator means at a time;
8. means for shining a third coherent laser beam through the openings in said second modulator means and onto a hologram created by use of elements (1), (2), (3), (4), and (5);
9. means for moving said third coherent laser beam and said hologram relative to each other;
10. means for detecting an oscillatory component in the output created by use of elements (6), (7), (8), and (9), whereby the presence or absence of coincidence between the information represented by the hologram and the information represented by the third coherent laser beam may be determined.

3. An optical information storage and retrieval system as claimed in claim 2 wherein said means for detecting an oscillatory component in the output created by elements (6), (7), (8), and (9) comprise:

1. light deflecting means for applying the third coherent laser beam onto the hologram to scan it;

2. light guiding means for deriving a correlation output light when the third coherent laser beam is shone onto the hologram;
3. coincidence matching detection means comprising photo detecting elements for detecting the correlation output light; and
4. an electric oscillation detecting means for detecting an oscillatory component in the output from said coincidence matching detection means to determine coincidence matching.

4. An optical information storage and retrieval system as claimed in claim 3 wherein said electric oscillation detecting means comprises a high-pass filter which has a cutoff frequency for detecting an oscillatory component which is directly proportional to the distance between the openings on said second modulator means and inversely proportional to the wave length of the first coherent laser beam.

5. An optical information storage and retrieval system as claimed in claim 4 and further comprising a Fourier-transform lens located between said first modulator means and said photo recording surface.

6. An optical information storage and retrieval system as claimed in claim 5 wherein the cutoff frequency of said high-pass filter is furthermore inversely proportional to the focal length of said Fourier-transform lens.

7. An optical information storage and retrieval system as claimed in claim 4 wherein the relative movement between said third coherent laser beam and said hologram is at a constant velocity with respect to each other.

8. An optical information storage and retrieval system as claimed in claim 7 wherein the cutoff frequency of said high-pass filter is furthermore proportional to the constant velocity referred to in claim 7.

9. An optical information storage and retrieval system as claimed in claim 7 wherein the relative movement between the hologram and the third coherent laser beam is effected by means for deflecting the laser beam while the hologram is stationary.

10. An optical information storage and retrieval system as claimed in claim 7 wherein the relative movement between the hologram and the third coherent laser beam is effected by means for revolving the hologram.

11. An optical information storage and retrieval system as claimed in claim 2 and further comprising means for moving the first and second coherent laser beam and said photo recording surface relative to each other in successive parallel rows, whereby a matrix array of holograms may be recorded on said photo recording surface.

12. An optical information storage and retrieval system as claimed in claim 11 and further comprising means for recording full "ON" bits in predetermined ones of said plurality of holograms so as to obtain a synchronizing signal when said matrix array of holograms are scanned by the third coherent laser beam.

13. An optical information storage and retrieval system as claimed in claim 11 and further comprising means for moving said third coherent laser beam and said matrix array of holograms relative to one another at a speed constant during the scanning of each row and wherein holograms in a row normal to the direction of scanning by the third coherent laser beam are made in a manner such that the incident angle of the second coherent laser beam during the recording of each hologram in the row is different for every hologram in the row, whereby the correlation output light from each hologram may be separately resolved at the time of coincidence matching detection.

* * * * *